US012461250B1

United States Patent
Saldanha Tavares

(10) Patent No.: US 12,461,250 B1
(45) Date of Patent: Nov. 4, 2025

(54) SYSTEM TO DETERMINE ANTENNA POINTING DIRECTION

(71) Applicant: AMAZON TECHNOLOGIES, INC., Seattle, WA (US)

(72) Inventor: Marcos Bruno Saldanha Tavares, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 429 days.

(21) Appl. No.: 18/059,193

(22) Filed: Nov. 28, 2022

(51) Int. Cl.
   *G01S 19/25* (2010.01)
   *H04B 7/0426* (2017.01)
   *H04W 64/00* (2009.01)

(52) U.S. Cl.
   CPC ............ *G01S 19/258* (2013.01); *H04B 7/043* (2013.01); *H04W 64/003* (2013.01)

(58) Field of Classification Search
   CPC ..... G01S 19/258; H04B 7/043; H04W 64/003
   See application file for complete search history.

(56) References Cited

U.S. PATENT DOCUMENTS

| 7,522,102 | B2* | 4/2009 | Shi ........................... H01Q 1/28 342/359 |
| 2013/0210424 | A1* | 8/2013 | Boustie .............. H04B 7/18563 455/427 |
| 2018/0115062 | A1* | 4/2018 | Cummings .......... H04B 7/0617 |
| 2021/0258053 | A1* | 8/2021 | Göransson ............ H04W 16/28 |
| 2022/0255786 | A1* | 8/2022 | McCormick .......... H04L 27/367 |
| 2022/0321185 | A1* | 10/2022 | Pepin ..................... H04B 17/12 |
| 2024/0154652 | A1* | 5/2024 | McCormick ......... H04B 17/318 |
| 2024/0259055 | A1* | 8/2024 | Miranda .............. H04B 7/2041 |

OTHER PUBLICATIONS

Kong, et al., "Research on Satellite Positioning Based on Total Least Squares Algorithm", Journal of Physics: Conference Series, IPEC, 2021, 8 pgs. Retrieved from the Internet: URL: https://iopscience.iop.org/article/10.1088/1742-6596/1952/4/042131.

Sarmento, et al., "Development and Evaluation of Least Square Satellite Tracking in Real Antenna Control System", Aug. 2019, 6 pgs. Retrieved from the Internet: URL: https://www.researchgate.net/publication/335028299_Development_and_Evaluation_of_Least_Square_Satellite_Tracking_in_Real_Antenna_Control_System.

(Continued)

*Primary Examiner* — Kenneth T Lam
(74) *Attorney, Agent, or Firm* — Lindauer Law, PLLC

(57) ABSTRACT

A satellite provides communication between user terminals (UTs) and ground stations that connect to other networks, such as the Internet. The satellite uses a direction beam to transmit a beacon signal to particular areas on the Earth. To establish initial contact with a satellite, a UT searches for the beacon signal using a phased array or other steerable antenna with a directional receive pattern. While searching, a set of received beacon signal strength values are acquired while pointing the receive pattern in different sample directions specified by azimuth and elevation. The sample directions may be based on a predicted location of the satellite. The set of signal strength values and associated azimuth and elevation values are processed using a least-squares estimator to determine an estimated direction. The estimated direction may be used to point the antenna, allowing sufficient gain to perform an initial network entry and subsequent communication.

20 Claims, 8 Drawing Sheets

(56) References Cited

OTHER PUBLICATIONS

Tayem, Nizar, "Azimuth/Elevation Directional Finding with Automatic Pair Matching", Hindawi Publishing Corporation, International Journal of Antennas and Propagation, vol. 2016, Article ID 5063450, Apr. 11, 2016, 10 pages. Retrieved from the Internet: URL: https://www.hindawi.com/journals/ijap/2016/5063450/.

* cited by examiner

SAMPLING PARAMETERS 702

| PARAMETER 704 | VALUE 706 |
|---|---|
| Maximum Elevation Deviation from Predicted | ±7° |
| Maximum Azimuth Deviation from Predicted | ±10° |
| Receive Direction Sample Time (ms) | 1 |
| Antenna Settling Time (microseconds) | 500 |

...

SAMPLE DATA 190

| TIME 732 | AZIMUTH "Φ" 734 | ELEVATION "θ" 736 | RECEIVED SIGNAL STRENGTH DATA 738 |
|---|---|---|---|
| 1 | 70 | 40 | 111, 109, 113, 117, ... |
| 2 | 67 | 43 | 107, 105, 109, 103, ... |
| 3 | 73 | 46 | 193, 201, 197, 195, ... |
| 4 | 76 | 49 | 171, 167, 173, 171, ... |
| ... | ... | ... | ... |

...

PARAMETER DATA 192

| PARAMETER 742 | REFERENCE SYMBOL 744 |
|---|---|
| Absolute value of the difference between receive beam direction unit vector and actual direction unit vector. Note that maximum gain is achieved when both are equal | $\beta$ |
| Receive antenna gain relative to isotropic radiator (toward transmitter) | $G_R(\beta)$ |
| Receive Power | $P_R$ |

SYSTEM TO DETERMINE ANTENNA POINTING DIRECTION

BACKGROUND

A satellite may provide communication service to one or more user terminals.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 7 illustrates sampling parameters, sample data, and parameter data, according to some implementations.

Figure 1:
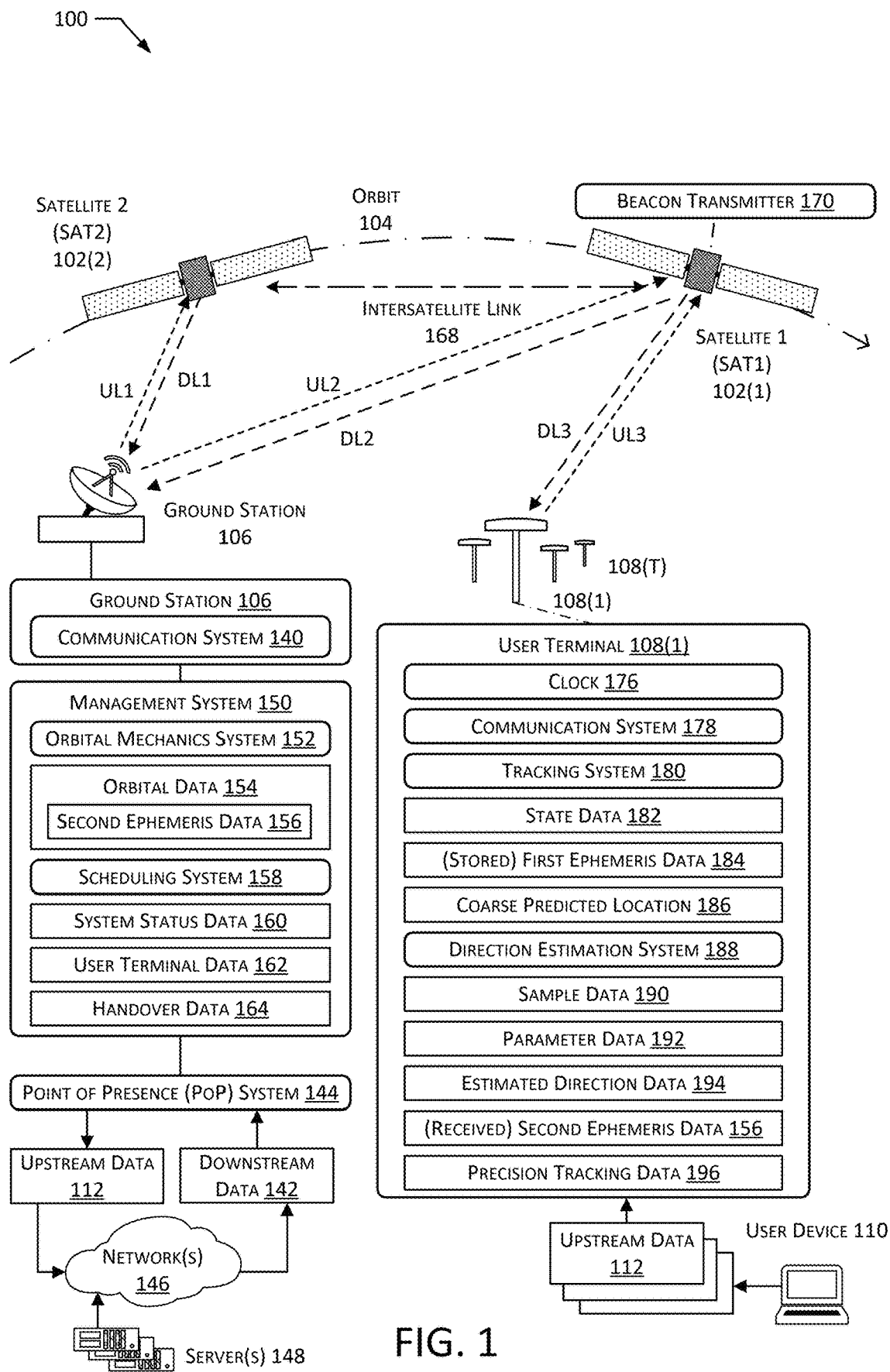
FIG. 1 illustrates a system that uses receive signal strength samples and a least-squares algorithm to rapidly acquire a satellite for subsequent tracking and communication, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. The satellites provide communication services between devices, such as user terminals (UT) located on or near a body such as the Earth. For example, a UT at a first geographic location (geolocation) on the Earth may send upstream data to a first satellite that is in range of the UT. The first satellite may send the upstream data to a ground station, another satellite, and so forth. For example, the first satellite may send the upstream data to a ground station that in turn sends the upstream data to a point-of-presence (PoP). The PoP may then send the upstream data to a device on another network, such as a server on the Internet. Likewise, downstream data destined for the UT may be received at the PoP. The PoP sends the downstream data to the ground station that in turn sends the downstream data to the first satellite. The first satellite then sends the downstream data to the UT.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite in a non-geosynchronous orbit (NGO) may be in range of a particular UT for only a few minutes. From the perspective of the UT, the NGO satellites are in constant motion relative to the Earth. In comparison, a geosynchronous satellite has an orbital period that coincides with the rotation of the Earth, so a geosynchronous satellite appears to remain motionless with respect to the Earth. While the apparent motionlessness with respect to the UT removes the need to account for this motion, other drawbacks associated with the geosynchronous satellites remain.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ½ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate the process of a UT establishing communication with a satellite and initially joining the network, such as after the UT powers up. Further complicating the situation are additional factors such as beacon beamwidth that determines how large an area of the Earth's surface is reached by the beacon transmission with sufficient power and the receive beamwidth that indicates how large an area of the sky the receiver can cover at a given time while still being able to receive the beacon transmission. Colloquially, for the UT to reliably "hear" the beacon transmission, the UT needs to point the gain of its antenna towards the satellite while the UT is within the footprint of the satellite's beacon signal.

Traditional approaches may include scanning the sky for a beacon transmission using a spiral search or rectangular search. However, this may be time intensive, delaying acquisition of the beacon transmission. If the UT has access to current ephemeris data, a relatively precise predicted location of the satellite may be calculated and used to determine a predicted direction to direct the antenna to point a receive beam in the predicted direction. Depending upon the accuracy of the current ephemeris data and other factors, such as space weather, the UT may still need to perform some fine tuning of the direction of the receive beam.

Due to various factors that can affect the orbit of a satellite, the older the ephemeris data is, the less likely the predicted location of the satellite will correspond to the actual location. Ephemeris data may also be outdated due to changes in satellite tasking, new satellites being added, others being unavailable for use, and so forth. An incorrect installation may also result in a difference between the predicted location and the actual location. For example, if the UT is not properly aligned to true north, or the antenna in not level, even if the predicted location is accurate a variance between the predicted location (at least relative to the antenna) and the actual location will be present. Depending on the variance between the predicted direction and the actual direction and overall motion of the satellite being sought, conventional techniques may fail entirely. For example, the satellite may move out of the search area before the UT is able to locate the beacon, missing the beacon transmission entirely. This problem is particularly acute given swiftly moving NGO satellites, narrow receive beamwidths, transmit power constraints on the beacon transmission, and so forth. As a result, such approaches take an unacceptably long time to complete, and are prone to failing to find the beacon transmission.

Described in this disclosure are systems and techniques to facilitate rapid determination of an estimated direction toward a satellite using a plurality of samples of receive signal strength processed using a least-square algorithm. This technique may be used for initial network entry, tracking once a satellite has been acquired, and so forth.

Operation of the system specifies a minimum link budget to provide reliable reception by the UT. For example, the link budget calls for a minimum −3 decibel (dB) signal-to-noise (SNR) ratio of the beacon transmission as received by the UT. To attain the link budget, the satellite may be directing the beacon transmission such that the UT is within the beacon beamwidth while the UT is directing a receive beam toward the satellite.

While attempting to find a satellite in the constellation the UT retrieves previously stored ephemeris data about one or more satellites in the constellation. This stored ephemeris data may be out of date. For example, the stored ephemeris data may be stored in the UT at manufacture, before shipment, and so forth. Data such as a current time and a geolocation of the UT is determined. For example, the UT may include a global navigation satellite system receiver that is used to provide time and geolocation. In another example, the UT may communicate with another device such as a smartphone to receive current time and geolocation data. Using the stored ephemeris data, the current time, and the geolocation, a coarse predicted location of one or more satellites of the constellation is calculated. However, this coarse predicted location may differ from the actual location of the satellite due to changes in the ephemeris data, time errors, UT geolocation errors, and so forth. A coarse predicted direction may be characterized by a pair of azimuth and elevation angles representative of a line extending from the UT to the coarse predicted location of a satellite.

A coarse predicted area may be associated with the predicted location, with the coarse predicted area taking into consideration at least some of these factors. For example, the predicted area may comprise an area in the sky (relative to the UT) that the satellite is expected to be found in 0.999 of the time.

A set of sample directions are determined. In one implementation, the set of sample directions may comprise three or more sample directions that are equally angularly distributed around the coarse predicted direction. In other implementations, the set of sample directions may be determined using other techniques described herein. The gain of the electronically steerable receive antenna, or receive beam, is directed towards each of the sample directions and a receiver is used to determine and detect, if present, a beacon transmission and acquire received signal strength data. The beacon transmission is transmitted by the satellite. In some implementations the beacon transmission may be a dedicated transmission, while in other implementations the beacon transmission may comprise a portion of downlink data transmissions used to communicate with other UTs.

The UT accesses parameter data associated with operation of the system or parts of the system. For example, the parameter data may include a transmit power of the satellite, transmit gain of the satellite's antenna(s) used to emit the beacon transmission, beacon beamwidth, receive beamwidth of the UT receive antenna, and so forth.

The sample data and the parameter data are processed using a least-square estimation algorithm to determine an estimated direction toward the satellite. The least-square estimation algorithm utilizes a comparison between actual power received for each of the sample directions and predicted power to determine a candidate direction that results in a minimum overall difference between the actual and predicted powers for each of the sample directions. For example, the algorithm may use a gradient descent method to evaluate different candidate directions. The candidate direction with the least variance may be designated as the estimated direction.

Once an estimated direction has been determined, the UT may begin to track the satellite transmitting the beacon transmission. In one implementation, the beacon transmission may include current ephemeris data for at least a portion of the constellation. In another implementation, the current ephemeris data may be transmitted separately from the beacon transmission. In either event, the UT may receive the current ephemeris data. The current ephemeris data may then be used to determine a precision predicted location that is more accurate, relative to the stored ephemeris data, of the satellite. The precision predicted location may then be used to steer the antenna (or the gain thereof) for transmission (uplink) and reception (downlink) operation. This tracking may involve steering the antenna in smaller angular increments then those between the sample directions. For example, during search the sample directions may be separated by 7 degrees in azimuth, while during tracking the antenna may change at increments of 1 degree (or less) in azimuth.

In other implementations, once the beacon transmission is detected, the UT may track using techniques other than ephemeris data. For example, the UT may acquire additional sample data and determine a subsequent estimated direction that is used. In another example, the UT may determine a direction to track the satellite using signal amplitude, doppler shift of a downlink signal, and so forth.

By using the system and techniques described in this disclosure efficiency of a communication system using a satellite constellation is substantially improved. The time required to find a satellite in the sky and establish communication is substantially reduced. This allows a UT to more quickly establish communication with a satellite and begin using the network to pass traffic.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with its antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, allows improved re-use of spectrum by different devices, and so forth.

The system 100 shown here comprises a plurality (or "constellation") of satellites 102(1), 102(2), . . . , 102(S), each satellite 102 being in orbit 104. Also shown is a ground station 106, user terminals (UTs) 108, and user devices 110. Each user device 110 may execute one or more application modules. For example, the application modules may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 168 provides for communication between satellites 102 in the constellation.

One or more ground stations 106 are in communication with one or more satellites 102. The ground stations 106 may pass data between the satellites 102, a management system 150, networks 146 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks 146. For example, the ground station 106 may connect to a terrestrial fiber optic communication network 146. The ground station 106 may act as a network gateway, passing data between the one or more communication networks 146 and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 may be in communication with a management system 150. The management system 150 may also be in communication, via the ground stations 106, with the satellites 102 and the UTs 108 that have joined the network 146. The management system 150 coordinates operation of the satellites 102, ground stations 106, UTs 108, and other resources of the system 100. The management system 150 may comprise one or more of an orbital mechanics system 152 or a scheduling system 158. The management system 150 may comprise one or more servers 148 or other computing devices.

The orbital mechanics system 152 determines orbital data 154 that is indicative of a state of a particular satellite 102 at a specified time. In one implementation, the orbital mechanics system 152 determines the orbital data 154 that predicts location, velocity, and so forth of particular satellites 102 at particular times or time intervals using second ephemeris data 156. The second ephemeris data 156 may comprise orbital elements and other information that represent characteristics of the orbit 104 of the satellites 102 in the constellation. The second ephemeris data 156 may be current in that it is updated with respect to a time window suitable for operations. For example, the second ephemeris data 156 may be updated every two hours, following a maneuver, and so forth. In some implementations, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

During operation, the second ephemeris data 156, or a portion thereof, may be transmitted via the satellites 102 of the constellation. For example, a downlink may be used to send the second ephemeris data 156 to all UTs 108 in current communication with a satellite 102, a beacon transmission may be used to send second ephemeris data 156 to UTs 108 that have not yet joined the network 146, and so forth.

The scheduling system 158 schedules resources to provide communication to the UTs 108. For example, the scheduling system 158 may determine handover data 164 that indicates when communication is to be transferred from the first satellite 102(1) to the second satellite 102(2). Continuing the example, the scheduling system 158 may also specify communication parameters such as frequency, timeslot indicative of when transmission is permitted, and so forth. These communication parameters may be associated with operation of an uplink to the satellite 102, downlink from the satellite 102 to the UT 108, and so forth. During operation, the scheduling system 158 may use information such as the orbital data 154, system status data 160, user terminal data 162, and so forth.

The system status data 160 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 160 may be indicative of past status, predictions of future status, and so forth. For example, the system status data 160 may include information such as projected data traffic for a specified interval of time based on previous transfers of data. In another example, the system status data 160 may be indicative of future status, such as a satellite 102 being unavailable to provide communication service due to scheduled maneuvering, scheduled maintenance, scheduled decommissioning, and so forth.

The user terminal data 162 may comprise information such as a geolocation of a particular UT 108, if a particular UT 108 is offline, last known geolocation of a UT 108 that is reported as offline, and so forth. The user terminal data 162 may include a priority assigned to data associated with that UT 108. For example, a particular UT 108 in use by a business may be assigned a higher priority relative to a UT 108 operated in a residential setting. The user terminal data 162 may also include other information, such as information about the communication capabilities of that particular UT 108, and so forth. For example, over time, different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2).

The resource scheduling system 158 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the resource scheduling system 158 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations the handover data 164 may include a set of next satellites. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, the secondary satellite 102(3), the UT 108, or other devices. For example, the second satellite 102(2) may use an ISL 168 to send the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

The satellite(s) 102 include a beacon transmitter 170. The beacon transmitter 170 emits a beacon transmission. The beacon transmission may be used for a variety of purposes, including facilitating network entry by providing a signal for the UTs 108 trying to join the network to detect, distributing the second ephemeris data 156, and so forth. In some implementations a downlink signal carrying downstream data 142 may be used as the beacon transmission. The beacon transmission is discussed in more detail in the following description.

The UT 108 may include a clock 176. For example, the clock 176 may comprise a real-time clock that is set with respect to a common time reference standard associated with the ephemeris data. In some implementations, the time of the clock 176 may be set during manufacture, or set during setup of the UT 108 using an external time source. These external time sources may include, but are not limited to, a global navigation satellite system (GNSS), time signal receiver, external device with a clock such as a smartphone, and so forth.

The UT 108 includes a communication system 178, such as a satellite network interface, to establish communication with one or more satellites 102. The communication system 178 of the UT 108 may include components similar to those of a communication system 212 of a satellite 102 (see FIG. 2) and may perform similar communication functionalities. For example, the communication system 178 may include one or more modems, digital signal processors, power amplifiers, antennas, processors, memories, storage devices, communications peripherals, interface buses, and so forth. The antennas may comprise at least one antenna that implements multiple antenna elements, such as a phased array antenna. In some implementations, the antennas may comprise an antenna mounted to a steerable azimuth/elevation mount. In other implementations, the antenna may be physically fixed with an electronically steerable beam direction. For example, a phased array antenna may be operated to provide gain in a particular direction.

The UT 108 passes data between the constellation of satellites 102 and the user device 110. The UT 108 may connect to the user device 110 using a second network interface. For example, the second network interface may comprise a wireless local area network, wired local area network, terrestrial wide area network, and so forth. The user device 110 may execute one or more application modules. The data includes upstream data 112 sent by the user device 110 or downstream data 142 that is addressed to the UT 108 or the user device 110. For example, during operation an application module may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

The UT 108 includes a tracking system 180. During initial network entry, such as after the UT 108 first powers on or after a reset, the tracking system 180 searches and finds a beacon transmission from a satellite 102 and joins the network.

To search for the beacon transmission, the tracking system 180 uses state data 182 and previously stored first ephemeris data 184 to determine a coarse predicted location 186 of a satellite 102. The state data 182 may comprise information indicative of current time and a geolocation associated with the UT 108. The current time may be obtained from the clock 176 or other external source. The geolocation may be determined using a GNSS, received from an external device, may have been previously stored, and so forth. For example, the geolocation may be provided from a smartphone that is in communication with the UT 108. The geolocation may be indicative of coordinates with respect to a surface of the Earth. In some implementations the geolocation may include altitude information.

In some implementations, the state data 182 may include other information, such as a heading or orientation of the antenna of the UT 108. For example, the state data 182 may indicate a magnetic heading, heading relative to true north, and so forth. The state data 182 may include other information such as orientation of the antenna relative to vertical, such as tilt. The state data 182 may include altitude of the antenna. For example, the state data 182 may include an altitude of one or more of the antenna or other portion of the UT 108. In some implementations the state data 182 or portions thereof may be assumed. For example, the heading of the antenna of the UT 108 may be assumed to be towards true north and the antenna of the UT 108 may be assumed to have a tilt of zero (perpendicular to vertical).

The previously stored first ephemeris data 184 provides information indicative of orbital elements of the orbit 104 of one or more satellites 102 of the constellation. For example, the first ephemeris data 184 may comprise orbital elements such as "two-line element" data for the satellites 102 in the constellation that was stored in a memory of the user terminal 108 before shipment of the UT 108 to the end-user, during setup of the UT 108 as provided by an external device, and so forth. As mentioned above, the first ephemeris data 184 may be out-of-date (relative to the second ephemeris data 156) due to various factors such as orbital perturbations, satellite maneuvers, satellite maintenance, and so forth.

Based on the coarse predicted location 186, a coarse predicted area may be determined. The coarse predicted area may specify an area within which the satellite 102 is expected to be found with a specified probability. For example, the coarse predicted area may comprise an area within which the satellite 102 is expected to be found 99.99% of the time.

A direction estimation system 188 may determine a set of sample directions. In one implementation, the sample directions may be based on the coarse predicted location 186. For example, the set of sample directions may comprise at least three sample directions that are equally distributed relative to one another and centered on a coarse predicted direction.

In some implementations, if stored first ephemeris data 184 is not available, the direction estimation system 188 may use a default direction instead of a coarse predicted direction based on the coarse predicted location 186. The default direction may be based on the state data 182. For example, based on one or more of the current latitude, longitude, and altitude of the UT 108, a default direction may be calculated or retrieved from memory. The default direction may be selected to maximize the likelihood that a satellite 102 of the constellation is transiting that portion of the sky at any given time. For example, if the UT 108 is located in the northern hemisphere and based on the orbital inclination and direction of the satellites 102 in the constellation, the default direction may be towards the northwest.

The direction estimation system 188 operates the communication system 178 to direct a receive beam toward each of the sample directions in the set of sample directions. While directed in a sample direction, received signal strength data is acquired using a receiver that specifies a received signal strength of the beacon transmission. The direction estimation system 188 determines sample data comprising information about the particular sample direction such as azimuth and elevation, and the received signal strength data.

In some implementations, the direction estimation system 188 may operate the communication system 178 to provide a specified receive direction sample time. The receive direction sample time specifies how long the antenna receive beam is pointed in a particular direction to acquire received signal strength data. For example, the beacon transmission may comprise a series of superframes, each superframe in turn comprising a series of subframes, with each subframe in turn comprising a series of synchronization signals and other information. The receive direction sample time may be longer than the time associated with transmitting individual synchronization signals, to allow time to acquire the received signal strength data, while being shorter than the time associated with transmitting a subframe. Continuing the example, the superframes may have a duration of 26.78 milliseconds (ms), subframes may have a duration of 1.33 ms, and an individual symbol may be represented by a synchronization signal having a duration of 0.0025 ms. In one implementation, the receive direction sample time may have a value of between 0.08 ms and 1.33 ms. In other implementations, the receive direction sample time may differ due to other factors, such as estimated drift of the clock 176. The receive direction sample time may be less than the time associated with transmission of an entire subframe or superframe.

During acquisition of the sample data 190, the information of interest is the received signal strength of a beacon signal, if any. As a result, the receive direction sample time may be relatively short. This facilitates the direction estimation system 188 quickly transitioning the receive beam to other sample directions to acquire additional received signal strength data. Acquisition of additional instances of sample data 190 including one or more of a plurality of samples of received signal strength data for a particular sample direction, or a plurality of sample directions may be used to increase the precision of the estimated direction data 194. Alternatively, the estimated direction data 194 may be generated very quickly using three or more sample directions and a relatively small number of received signal strength values, allowing the UT 108 to direct the antenna towards the estimated direction with very low latency, reducing latency for initial network entry.

The direction estimation system 188 determines parameter data 192. For example, the parameter data 192 may be retrieved from storage. The parameter data 192 provides information indicative of parameters associated with operation of the system 100 or portions thereof. For example, the parameter data 192 may comprise one or more of transmit power of the first satellite 102, transmit antenna gain of the first satellite 102, receive gain of the antenna of the UT 108, and so forth.

The direction estimation system 188 may implement a least-square estimation algorithm that evaluates or otherwise determines a candidate direction that minimizes the difference between actual power of a received beacon signal as measured and a predicted power of the beacon signal. The direction estimation system 188 may determine estimated direction data 194 based on the candidate direction that results in the least variance. The equations associated with this algorithm are discussed in more detail with regard to FIG. 8.

The antenna of the communication system 178 is then operated based on the estimated direction data 194. For example, if the UT 108 comprises an electronically steerable phased antenna array, the estimated direction data 194 is used to operate the antenna to direct gain at a first time towards the estimated direction. In another example, if the UT 108 comprises a mechanical steered antenna, the estimated direction data 194 may be used to operate the antenna to direct the antenna at a first time towards the estimated direction, and so forth.

With the receive beam of the antenna now directed towards the satellite 102, the UT 108 may establish communication with the satellite 102 and join the network. In one implementation, the beacon transmission or another transmission from the satellite 102 provides the (received) second ephemeris data 156 that is more current and thus accurate compared to the previously available (stored) first ephemeris data 184. The tracking system 180 may then use the state data 182 and second ephemeris data 156 to calculate precision tracking data 196 and begin tracking the satellite 102. In another implementation, once the beacon transmission has been detected, the UT 108 may use other techniques to track the satellite 102. For example, the UT 108 may acquire additional sample data 190 and determine a subsequent estimated direction that is used. Based on a set of estimated directions, a trajectory of the satellite 102 may be determined and used. In another example, changes in signal amplitude, doppler shift of a downlink signal, and so forth may be used to track the satellite 102.

With the UT 108 now tracking the satellite 102, bidirectional communication may commence. For example, the communication system 178 of the UT 108 may direct the gain of the electronically steerable phased array antenna towards the satellite 102 using the precision tracking data 196 determined using the second ephemeris data 156 and send a signal to the satellite 102. Once the beacon transmission has been detected and the satellite 102 is being tracked by the tracking system 180, tracking of the satellite 102 may involve steering the antenna in smaller angular increments than those associated with acquiring the sample data 190. For example, during acquisition of the sample data 190 a change between sample directions may involve a shift of 4 degrees in azimuth and 4 degrees in elevation, while during tracking the antenna may change at increments of less than 1 degree in azimuth and less than 1 degree in elevation.

The tracking system 180 may provide information such as coarse predicted areas or precision tracking data 196 on an ongoing basis. For example, the UT 108(1) may determine coarse predicted location data every second during search and may determine precision tracking data 196 every 100 ms once tracking begins. In other implementations other intervals may be used.

By using the techniques described above, the UT 108 is able to quickly and efficiently search the sky to find the beacon transmission. Compared to traditional techniques, such as spiral or rectangular searches, these techniques result in a substantial decrease in the time required to find the beacon transmission. As a result, the UT 108 is able to rapidly join the network.

Once tracking is in progress and the UT 108 has joined the network by establishing communication with the satellite 102, the UT 108 may send upstream data 112 using the system 100. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 146, such as the Internet.

The system 100 may include one or more PoP systems 144. Each PoP system 144 may comprise one or more servers or other computing devices. Separate PoP systems 144 may be located at different locations. In one implementation, a PoP system 144 may be associated with providing service to a plurality of UTs 108 that are located in a particular geographic region.

The PoP systems 144 may manage communication between the system 100 and the network 146. For example, a first PoP system 144 may receive the upstream data 112 and send that upstream data 112 to the network 146. In another example, the first PoP system 144 may receive the downstream data 142 and proceed to attempt delivery of the downstream data 142 to the UT 108.

The PoP system 144 is in communication with one or more ground stations 106(1), 106(2), . . . , 106(G) and the management system 150. In some implementations one or more functions may be combined. For example, the PoP system 144 may perform one or more functions of the management system 150. In another example, the PoP system 144 may be included in an integrated ground station 106.

One or more servers 148 may communicate with the POP system 144 via the network(s) 146. The servers 148 may provide various functions, such as content delivery, navigation, data storage and retrieval, and so forth. For example, the servers 148 may store video content that may be requested and streamed to a user device 110.

The satellite 102, the ground station 106, the user terminal 108, the user device 110, the management system 150, the PoP system 144, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 146. For example, the transitory machine-readable signal may comprise transmission of software by the Internet.

Figure 2:
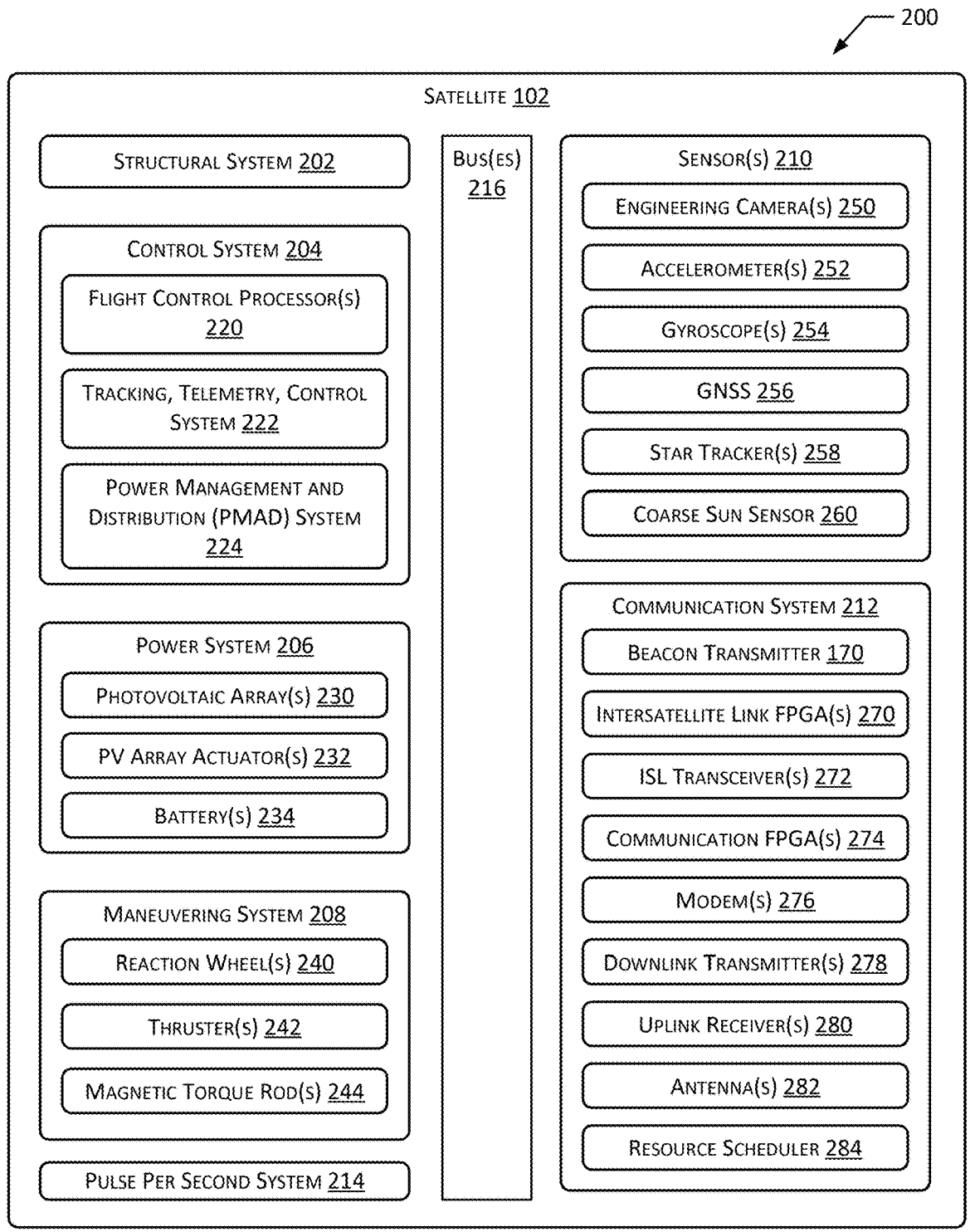
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations, the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may comprise the beacon transmitter 170. The beacon transmitter 170 may generate the beacon transmission that is then emitted by one or more of the antenna(s) 282.

The communication system 212 may include hardware to support the intersatellite link 168. For example, an intersatellite link FPGA 270 may be used to modulate data that is sent and received by an ISL transceiver 272 to send data between satellites 102. The ISL transceiver 272 may operate using radio frequencies, optical frequencies, and so forth.

One or more communication FPGA(s) 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102. The phased array antenna may be electronically steerable, allowing a beam to be electronically directed in a specified direction.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the Earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include a resource scheduler 284 that specifies uplink resources for a UT 108 to communicate with the satellite 102. The resource scheduler 284 may issue grant data indicative of these uplink resources responsive to a request from the UT 108 or may issue grants based on expected use. The grant data is then sent using the downlink transmitter 278.

Figure 3:
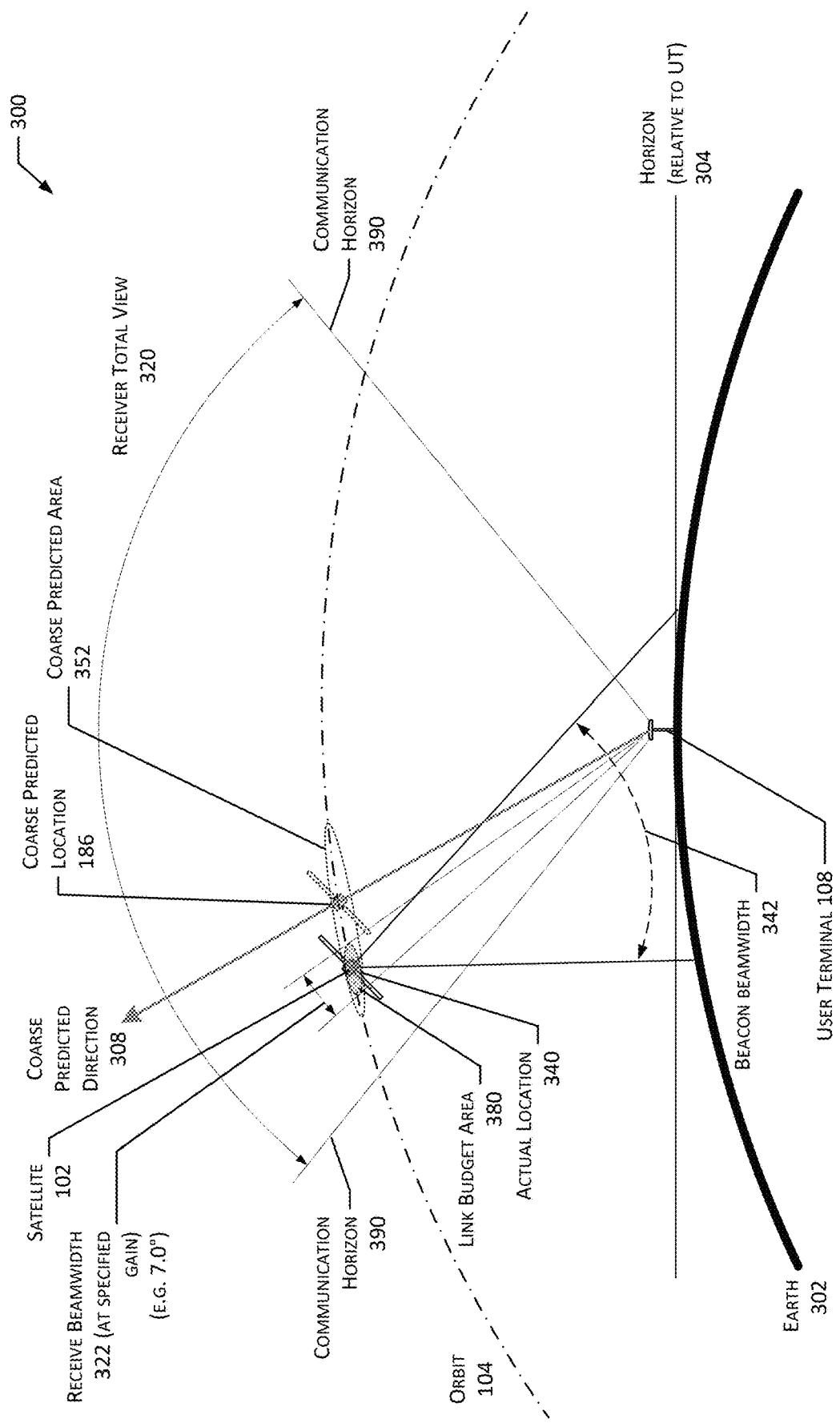
FIG. 3 illustrates a coarse predicted location of a satellite, beacon beamwidth, and receive beamwidth, according to some implementations.

FIG. 3 illustrates at 300 a coarse predicted location 186 of a satellite 102 and other aspects, according to some implementations. The orbit 104 with respect to Earth 302 is depicted with the satellite 102 at an actual location 340.

A single satellite 102 is shown for ease of illustration, and not by way of a limitation. The constellation may include many satellites 102 in the same or adjacent orbits 104, at different altitudes, and so forth. In some implementations the satellites 102 may not be in orbit 104. For example, the satellite 102 may be a statite that employs a solar sail to maintain a particular position.

The satellite 102 uses a beacon transmitter 170 to transmit a beacon transmission having a beacon beamwidth ("beamwidth") 342. "Beamwidth" as used in this disclosure may describe a solid angle that is representative of a primary lobe of antenna gain. The beacon beamwidth 342 produces a footprint or area on the Earth 302 or other object that the satellite 102 is orbiting within which the beacon transmission is greater than or equal to a minimum specified intensity.

Also depicted is a coarse predicted location 186 in a coarse predicted area 352 within which the satellite 102 is predicted to be. As shown in this implementation, the coarse predicted location 186 differs from the actual location 340. This may be due to a variety of factors, including the first ephemeris data 184 used by the tracking system 180 being out of date, uncertainty as to the geolocation of the UT 108, uncertainty as to the current time relative to a time reference standard, and so forth. A coarse predicted direction 308 is shown that extends from the UT 108 to the coarse predicted location 186.

Also depicted is the UT 108 and an associated receive beamwidth 322 of the antenna of the UT 108 while configured to receive the beacon transmission. The antenna(s) of the UT 108 has a communication horizon 390 relative to a local horizon 304 of the UT 108. The communication horizon 390 may be determined based on range of elevation that the antenna is able to traverse. For example, if the antenna is able to provide gain at an elevation of 30 degrees relative to the horizon 304, the communication horizon 390 would be 30 degrees. Below the communication horizon 390, the antenna is unable to provide gain in a specified direction.

The limits of the elevation as expressed by the communication horizon 390 and any azimuthal limitations, in implementations where the antenna has an azimuthal limitation, specify the receiver total view 320. The antenna of the UT 108 is expected to be able to establish communication with a satellite 102 that is within the receiver total view 320 and directing gain of the onboard antennas towards the earth 302.

In this illustration a link budget area 380 is depicted, showing the correspondence at the altitude of the orbit 104 between the beacon beamwidth 342 and the receive beamwidth 322. So long as the beacon beamwidth 342 is directed towards the UT 108 and the UT 108 has the receive beamwidth 322 directed towards the satellite 102, the link budget will provide sufficient SNR of the beacon transmission to allow the UT 108 to acquire and track the satellite 102.

Figure 4:
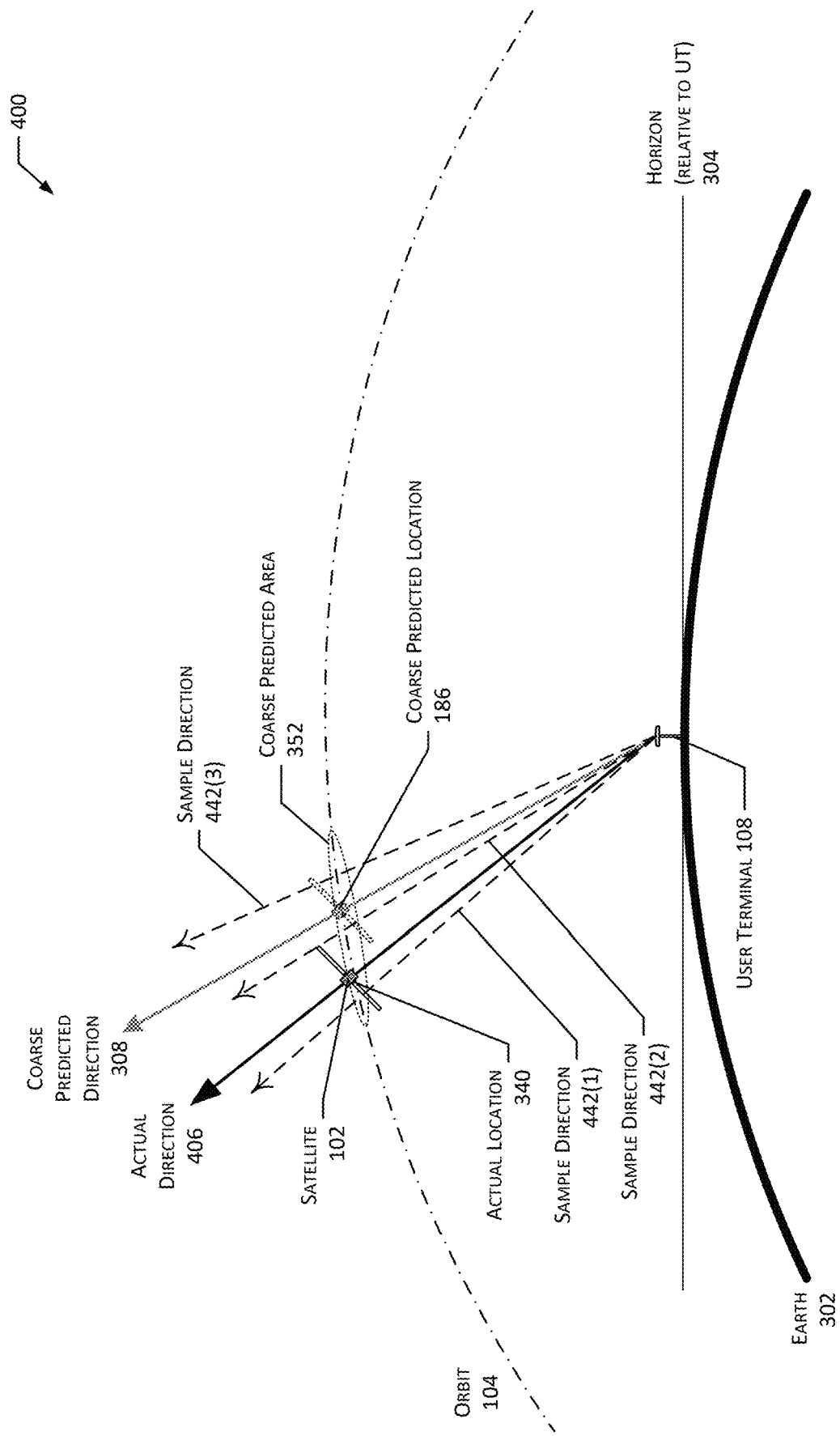
FIG. 4 illustrates a set of sample directions and an actual direction toward the satellite, according to some implementations.

FIG. 4 illustrates at 400 a set of sample directions and an actual direction toward the satellite 102, according to some implementations. This illustration continues the illustration of FIG. 3, with some elements removed for clarity.

As described above, the coarse predicted location 186 and the corresponding coarse predicted direction 308 are shown. Also depicted is an actual direction 406 that extends from the UT 108 to the actual location 340 of the satellite 102. The angular separation between the coarse predicted direction 308 and the actual direction 406 is sufficient in this example to prevent sufficient link budget from being acquired. For example, if the UT 108 were to direct the receive beam towards the coarse predicted direction 308, the SNR may be too low to reliably receive data in the beacon transmission.

In this illustration, three sample directions 442(1), 442(2), 442(3) are shown. In other implementations other numbers of sample directions 442(N) may be used. In some implementations the sample directions 442 may be evenly spaced, with respect to one or more of azimuth or elevation, relative to one another. For example, the three sample directions 442(1)-(3) may be evenly spaced around a zenith vector that extends straight up from the UT 108 with respective azimuth and elevation degree values of, {+3, +120}, {+3, +0}, and {+3, −120}. In some implementations the set of sample directions may be centered on the coarse predicted direction 308. In some implementations the set of sample directions may be determined such that each sample direction 442, or a portion of a corresponding receive beamwidth 322, passes through the coarse predicted area 352.

As described above, sample data 190 comprises information indicative of the sample directions 442 used, and the associated received signal strength data.

Figure 5:
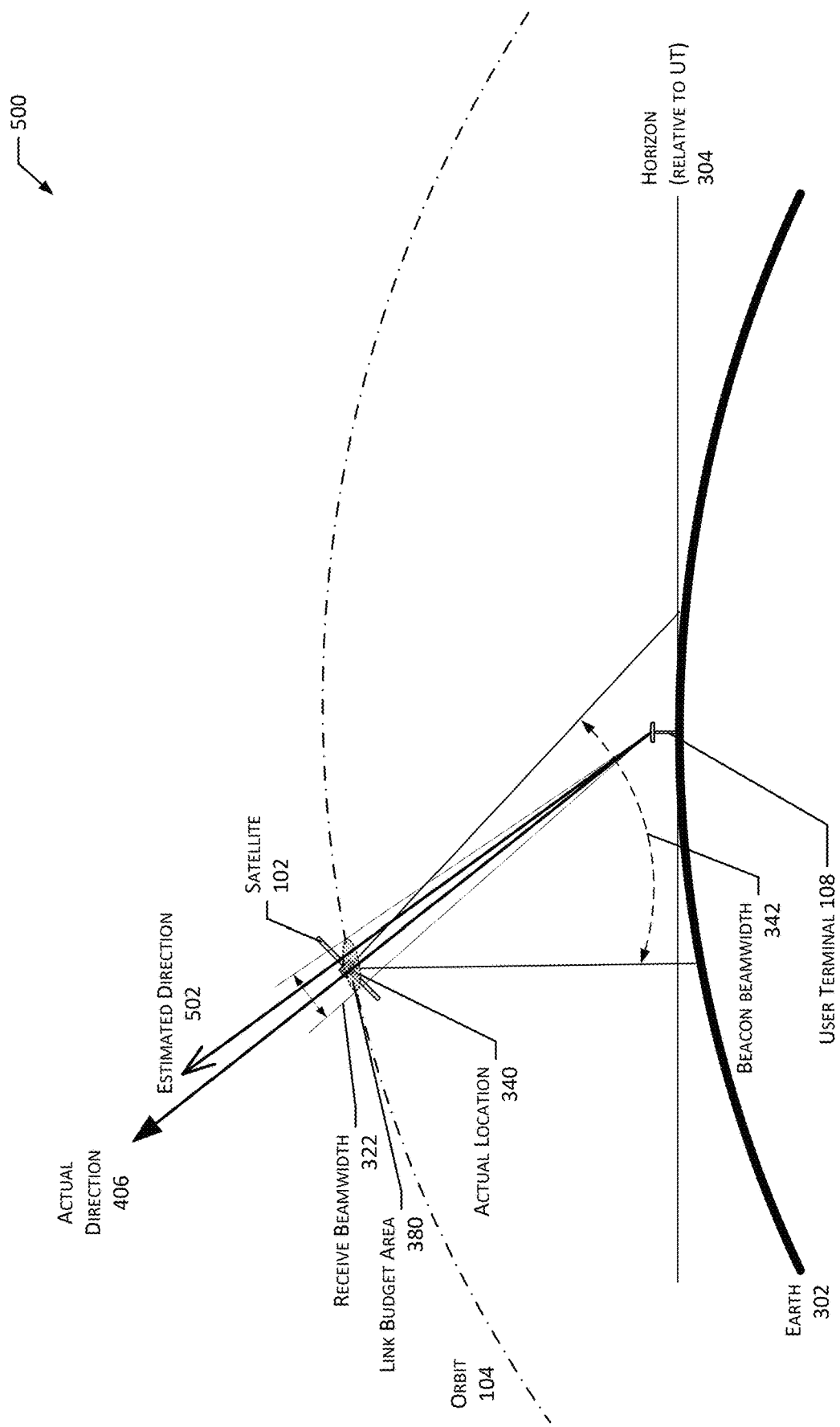
FIG. 5 illustrates the actual direction compared to an estimated direction based on the samples, according to some implementations.

FIG. 5 illustrates at 500 the actual direction 406 compared to an estimated direction 502 based on the sample data 190, according to some implementations. This illustration continues the illustration of FIG. 4, with some elements removed for clarity.

In this illustration, the direction estimation system 188 has used the sample data 190 and parameter data 192 to determine the estimated direction data 194 indicative of an estimated direction 502. The estimated direction 502 is relatively close to the actual direction 406. Because of this, with the antenna of the UT 108 operated to direct the receive beam toward the estimated direction 502, the satellite 102 is now within the link budget area 380. As a result, sufficient link budget is available to proceed with network entry or other communications operations.

Figure 6:
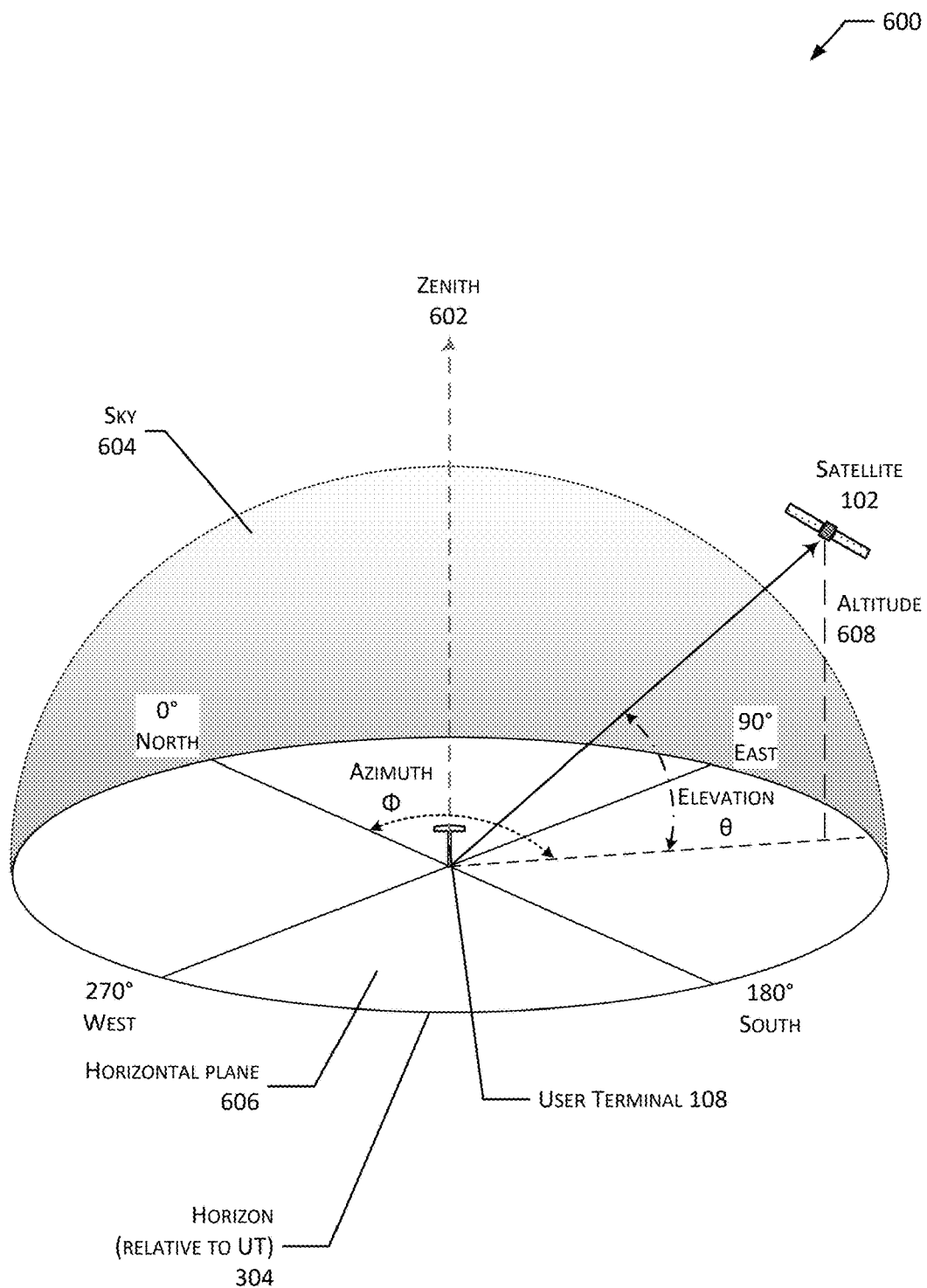
FIG. 6 illustrates azimuth and elevation, according to some implementations.

FIG. 6 illustrates at 600 azimuth and elevation, according to some implementations. In this illustration a zenith 602 is depicted as a vertical line extending upward from the UT 108. Also shown is sky 604 and a horizontal plane 606, with the horizon 304 at the intersection between the horizontal plane 606 and sky 604. The zenith 602 is normal to the horizontal plane 606.

The direction from the UT 108 to objects in the sky 604, such as the satellites 102 of the constellation, may be specified in terms of azimuth (phi or "Φ") and elevation (theta or "θ"). Azimuth specifies an angle between a specified reference direction in the horizontal plane 606, such as true North, and the direction within a horizontal plane. Elevation specifies an angle, in a vertical plane perpendicular to the horizontal plane 606 and passing through the UT 108 and the object in the sky 604, between the horizontal plane 606 and the direction.

FIG. 7 illustrates at 700 sampling parameters 702, sample data 190, and parameter data 192, according to some implementations.

The direction estimation system 188 may operate the communication system 178 based on one more sampling parameters 702 to acquire the sample data 190. The sampling parameters 702 may comprise one or more parameters 704 and associated values 706.

The sampling parameters 702 may specify maximum permitted deviations of sample directions relative to a specified direction, such as the coarse predicted direction 308. In some implementations, the set of sample directions may comprise sample directions 442 that are based on the coarse predicted direction 308. The set of sample directions may be determined such that each of the sample directions 442 deviates from the coarse predicted direction 308 by one or more of a maximum elevation deviation from predicted, or a maximum azimuth deviation from predicted. For example, if the maximum elevation deviation from predicted parameter 704 has a value 706 of "±7°" and the coarse predicted direction 308 has an elevation of +27°, the sample directions 442 may be limited to having elevation values that are between +20° and +34°.

The sampling parameters 702 may specify a receive direction sample time. The receive direction sample time specifies how long the antenna receive beam is pointed in a particular direction to acquire received signal strength data.

The sampling parameters 702 may specify an antenna settling time. The antenna settling time may specify a time during which the antenna is still in the process of being redirected to a specified direction. For example, an antenna such as a phased array antenna may be electronically steered by changing operating values for components, such as coefficients used by beamformers. Continuing the example, analog beamforming elements may require some time to receive respective updated coefficient values. The resulting antenna beam pattern may be distorted or otherwise deviate from that which is expected until all of the coefficient values have been updated in the analog beamforming elements. The antenna settling time may specify a minimum wait time to allow the receive beam pattern to manifest as expected.

The sampling parameters 702 may specify compensation values (not shown) that are used to adjust for variations in actual beam patterns compared to the model. For example, at relatively low beam pattern elevation angles, the beam pattern may change. The compensation values may be used to adjust for this change. The beam pattern elevation angle may comprise an angle between a plane of the phased array antenna and a line normal to the plane.

The sampling parameters 702 may specify a minimum angular separation between the sample directions 442, such as a minimum elevation separation and minimum azimuth separation between the sample directions 442 in a set of sample directions. For example, a minimum separation may be specified that is based on receive beam geometry.

The direction estimation system 188 may determine or receive sample data 190. The sample data 190 may comprise one or more of time 732, azimuth 734 of the sample direction, elevation 736 of the sample direction, or received signal strength data 738.

The time 732 is indicative of when the data was acquired. For example, the time 732 may comprise an index value, specify a particular time indicated by the clock 176, and so forth. In some implementations the communication system 178 may be operated to acquire received signal strength data 738 for respective sample directions 442 in a sequential manner. For example, received signal strength data 738(1) associated with a first sample direction 442(1) may be acquired during a first time 732(1), while received signal strength data 738(2) associated with a second sample direction 442(2) may be acquired during a second time 732(2), and so forth. In some implementations, the same sample direction 442(1) may be associated with a plurality of times 732.

The sample direction 442 may be specified by the azimuth 734 and the elevation 736. In other implementations, other coordinate or reference systems may be used.

The sample data 190 comprises received signal strength data 738. The received signal strength data 738 is indicative of a received power of a signal during the time 732. The received signal strength data 738 may be specified in terms of watts, decibel-milliwatts (dBm), or other units. In some implementations the received signal strength data 738 may be comprise an average of a plurality of individual measurements of received signal strength. For example, ten received signal strength measurements may be averaged to determine a value used as the received signal strength data 738.

The parameter data 192 is indicative of operation of one or more portions of the system 100. The parameter data 192 comprises one or more parameters 742. In the following equations, these parameters 742 are denoted using reference symbols 744. The parameters 742 may include one or more of a transmit power of the satellite 102, transmit antenna gain of the satellite 102, receive antenna gain of the antenna of the UT 108, receive power as measured at the UT 108, or other information.

Figure 8:
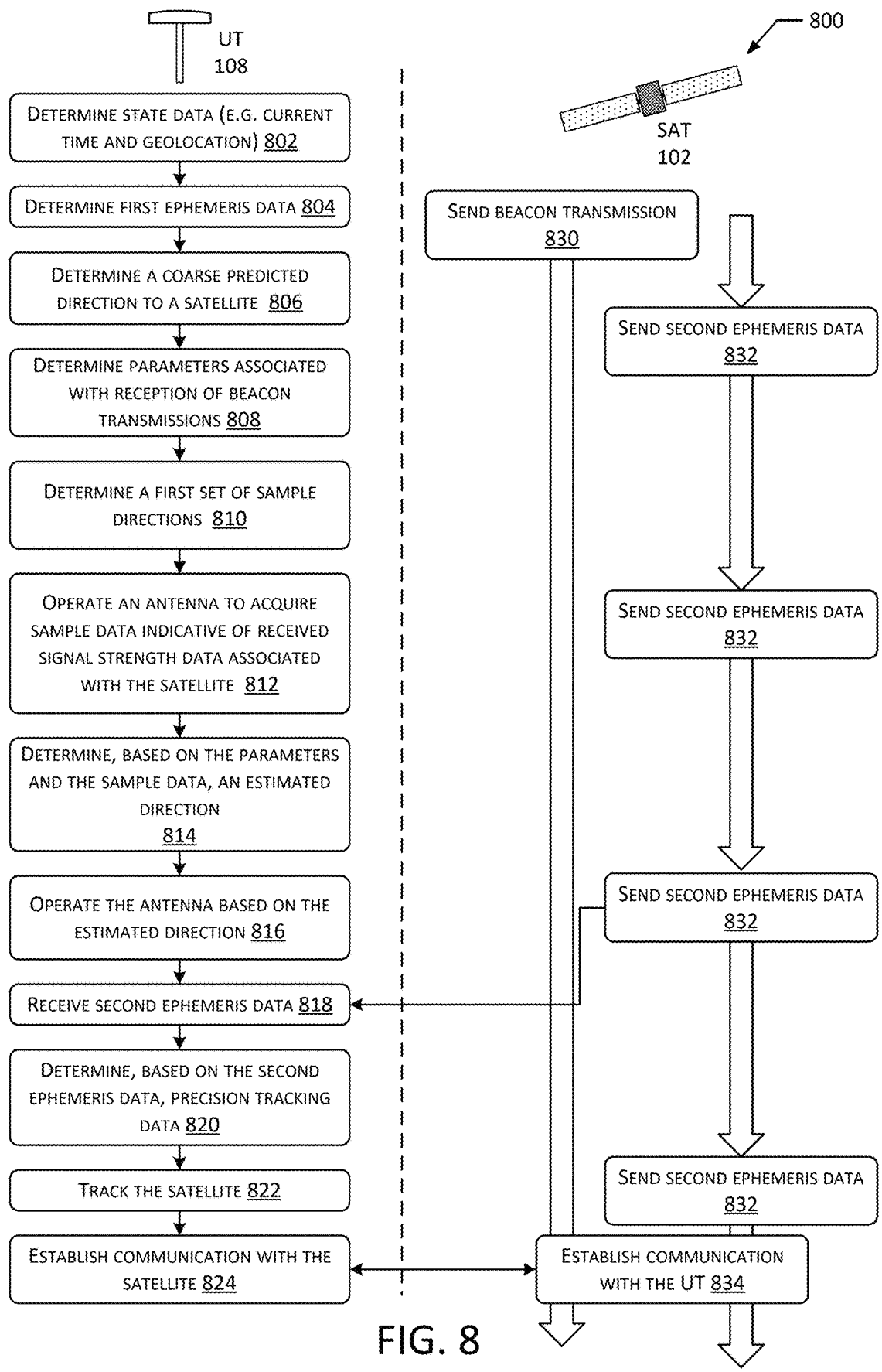
FIG. 8 is a flow diagram of a process to use the sample data to determine an estimated direction to a satellite, according to some implementations.

FIG. 8 is a flow diagram 800 of a process to use the sample data 190 to determine an estimated direction 502 to a satellite 102, according to some implementations. The process may be executed by a ground station 106, UT 108, satellite 102, or other device to establish or maintain communication. For example, the UT 108 may execute the process to receive data sent by a beacon transmission and perform initial network entry.

In this illustration, a UT 108 and a satellite 102 are shown. At 830 the beacon transmitter 170 of the satellite 102 sends a beacon transmission. The beacon transmission may comprise a first portion that comprises synchronization symbols and a second portion that comprises broadcast symbols. The synchronization symbols may comprise a training sequence, channel estimation data, and so forth. The broadcast symbols may comprise information to facilitate network entry. For example, the beacon transmission may comprise a plurality of subframes, the first portion of each subframe comprising 30 symbols and the second portion comprising 100 symbols.

In one implementation the beacon transmission may comprise a continuous transmission. In another implementation, the beacon transmission may be a dedicated transmission, while in other implementations the beacon may comprise a portion of a downlink transmission. At 832 the satellite 102 may also send the second ephemeris data 156. In the implementation shown here, the second ephemeris data 156 is repeatedly transmitted at successive times. In some implementations, the beacon transmission may include the second ephemeris data 156. In other implementations, the second ephemeris data 156 may be transmitted separately from the beacon transmission, as a subcarrier of the beacon transmission, as a different transmission from the beacon transmission, and so forth.

At 802 the UT 108 determines state data 182. For example, the state data 182 may comprise information indicative of a current time and a geolocation of the UT 108. In one implementation, the UT 108 may comprise a GNSS receiver that provides current time and geolocation information. In other implementations, the UT 108 may acquire this information from an external source. For example, the UT 108 may obtain current time and geolocation data from a smartphone that is in communication with the UT 108. In another example, the UT 108 may provide a user interface that is used to obtain the state data 182 from a user. In some implementations, the state data 182 may comprise one or more of antenna orientation with respect to a specified direction such as true north, tilt relative to vertical, altitude, or other information.

In some implementations, the geolocation may be indicative of a specified area on the surface of the Earth 302. For example, the system 100 may specify a set of areas that cover the Earth 302. The geolocation may be specified as a particular index number of these areas. In another example, the geolocation may be specified by postal code, city, and so forth.

At 804 the first ephemeris data 184 is determined. For example, previously stored first ephemeris data 184 may be retrieved, or may be determined based on previously stored data such as orbital elements. In some implementations, the first ephemeris data 184 may be associated with one or more satellites 102 of a constellation that comprises non-geostationary satellites.

At 806, based on the first ephemeris data 184 and the state data 182, a coarse predicted direction 308 toward a satellite 102 of the constellation is determined. The coarse predicted direction 308 may be specified in terms of azimuth and elevation, relative to the UT 108.

In some implementations, a default direction may be used instead of the coarse predicted direction 308. For example, if no first ephemeris data 184 is available, the direction estimation system 188 may utilize a predetermined default direction. In some implementations the default direction may be determined based on the state data 182. For example, the default direction may be determined based on the geolocation of the UT 108.

At 808 one or more parameters, such as the parameter data 192, associated with reception of beacon transmissions is determined. For example, the UT 108 may retrieve from memory previously stored parameter data 192 such as one or more of transmit power of the first satellite, transmit antenna gain of the first satellite, or receive antenna gain of the antenna.

At 810 a first set of sample directions toward a satellite 102 of the constellation are determined. The first set of sample directions comprise a plurality of sample directions 442. In some implementations the set of sample directions may comprise at least three sample directions 442(1)-(3).

In one implementation the first set of sample directions may be determined based on the coarse predicted direction 308. For example, the set of sample directions may be centered on the coarse predicted direction 308 and each of the sample directions 442 is evenly spaced with respect to other sample directions 442. Continuing the example, the angular separation between the coarse predicted direction 308 and each of the sample directions 442 may have the same absolute value. In another example, the set of sample directions may be determined by applying a predetermined set of values to the coarse predicted direction 308.

In another implementation, the first set of sample directions may be predetermined and retrieved based on one or more of the coarse predicted direction 308, the coarse predicted location 186, or other information. For example, a data structure may store, for specified ranges of coarse predicted directions 308, predetermined respective sets of sample directions. In some implementations, the predetermined respective sets of sample directions may take into consideration factors associated with operation of the antenna. For example, phase antenna arrays may exhibit different geometries of receive pattern based on the direction. The set of sample directions may be specified to account for these changes in geometry. For example, a first angular range may be associated with a first sample direction 442 in the set of sample directions. The first sample direction 442 may be based on a first receive beam geometry. In comparison, a second angular range may be associated with a second sample direction 442 in the set of sample directions. The second sample direction 442 may be based on a second receive beam geometry.

At 812 an antenna and receiver are operated to acquire sample data 190 based on the first set of sample directions. Acquisition of the sample data 190 may be based on the sampling parameters 702. In one implementation, the electronically steerable antenna is operated to direct a receive beam toward each of the sample directions 442 in the set of sample directions. While the receive beam is directed in one of the sample directions 442, the receiver is operated to acquire the received signal strength data 738 that is indicative of the received signal strength of a transmission from the satellite 102, such as the beacon transmission. In other implementations, such as utilizing a phased array antenna comprising digital beamformers, output from the antenna system may be processed to determine the received signal strength data 738 corresponding to the sample directions 442 simultaneously.

The received signal may be processed to determine if it corresponds with the satellite 102 being sought. For example, the received signal may be processed to determine satellite identification data, symbol sequence, or other information to distinguish the satellite 102 from other satellites 102 in the constellation. In some implementations, the management system 150 may direct satellites 102 to transmit symbol sequences that are locally unique, such as distinguishing a particular satellite 102 within a specified solid angle relative to the Earth. For example, satellites 102 in adjacent orbits 104 may be assigned different symbol sequences, while satellites 102 at the antipodes re-use those same symbol sequences.

At 814 an estimated direction 502 is determined based on the parameter data 192 and the sample data 190. The estimated direction 502 may be determined using parameter data 192 and the sample data 190 as input to a least-square estimation algorithm. The least-square estimation algorithm determines an actual power received for each of the sample directions 442 based on the parameter data 190 and the received signal strength data 738 for each of the sample directions 442. For each of the sample directions 442, a predicted power is determined that is based on the parameter data 190 and a difference between the sample direction 442 and a candidate direction. The algorithm determines the candidate direction (values of azimuth and elevation) that results in a minimum value of a square of an absolute value of a difference between the actual power received and the predicted power for the set of sample directions. This candidate direction may then be deemed the estimated direction 502.

For the following equations, directions may be specified using a spherical coordinate reference system relative to the UT 108 as a pair of values of azimuth and elevation (Ø, θ). In some implementations, the azimuth and elevation may be relative to true north and the horizontal plane 606 as described in FIG. 6. In other implementations, other reference directions may be used. For example, elevation may be specified as the angle relative to the zenith 602.

A transformation between (θ, Ø) and Cartesian coordinates, (x, y, z), is provided by the following equation:

$$\vec{u} = \begin{bmatrix} x \\ y \\ z \end{bmatrix} = \begin{bmatrix} \sin(\theta)\cos(\emptyset) \\ \sin(\theta)\sin(\emptyset) \\ \cos(\theta) \end{bmatrix}$$

where $\vec{u}$ is a unit vector in Cartesian coordinates.
Equation 1

In one implementation, an antenna beam may be modelled using a Gaussian beam model as shown in Equation 2, that specifies gain over an isotropic radiator. This may be used for one or more of receive beams or transmit beams.

$$G(\beta) = K \exp\left[-\frac{\mu}{h^2}\beta^2\right]$$

where K is a gain factor, μ=4 log(2), h represents the half-power beamwidth,
Equation 2A
and further where β is given by $$\beta = \|\vec{b} - \vec{t}\|$$

where $\vec{b}$ is the unit vector representing a boresight direction of the beam and $\vec{t}$ is the unit vector representing a direction pointing to a target (such as the actual direction 406 towards the satellite 102).

Equation 2B

In other implementations the antenna beam utilized may be asymmetric with respect to one or more axes. For example, elements of a phased array antenna may be operated to provide an antenna beam that is radially asymmetric with respect to its direction. In implementations in which the antenna beam is asymmetric, other models may be used to represent this asymmetry.

In some implementations the antenna beam may vary based on an angle relative to the antenna. For example, a phased array antenna may provide a Gaussian antenna beam in a direction that is perpendicular to a plane of the antenna, but may exhibit an ellipsoidal or other shape when the direction of the receive beam has an angle relative to a normal of the plane of greater than 70 degrees. In such implementations, different models may be used for particular angular ranges, correction factors may be applied to modify the Gaussian model, and so forth.

It is worthwhile to note that when $\vec{b} = \vec{t}$ the maximum antenna gain is achieved. This may be visualized in that gain is maximized when the beam is directed toward the satellite 102. Given the situation of maximized gain resulting from the beam being directed toward the satellite 102, the value of β becomes zero.

A received signal model may be determined using the Friis transmission formula that establishes that the receive power $P_R(t)$ at time instant t is given by $$P_R(t) = A(t)\frac{P_T G_T \lambda^2}{(4\pi\, d(t))^2} G_R(\beta) = P_0(t) G_R(\beta)$$

where A(t) is time-varying tropospheric attenuation, $P_T$ is transmit power, $G_T$ is transmit antenna gain over the isotropic radiator, λ is the wavelength of the carrier frequency, d(t) is the time-varying distance between transmit and receive antennas and $G_R(\beta)$ (as described earlier) represents the receive antenna gain over the isotropic radiator in the direction of the transmitter such as the satellite 102.

Equation 3

For simplicity of notation, a portion of the terms of Equation 3 may be collapsed as follows:

$$P_0(t) = A(t)\frac{P_T G_T \lambda^2}{(4\pi\, d(t))^2}$$

Equation 4

Equation 4 collapses terms of the Friis equation that are unrelated to the receive antenna pointing under $P_0(t)$, which is time-varying over the pass of the satellite 102 over the UT 108.

For the following, assume that N receive power measurements, each in a different sample direction 442, as indicated by the received signal strength data 738 are available to the UT 108. Using the Friis equations, these N receive power measurements may be expressed in the following equation set.

$$\tilde{P}_{R,1}(t) = P_{0,1}(t) G_R(\beta_1) + n_1(t)$$

$$\tilde{P}_{R,2}(t) = P_{0,2}(t) G_R(\beta_2) + n_2(t)$$

...

$$\tilde{P}_{R,N}(t) = P_{0,N}(t) G_R(\beta_N) + n_N(t)$$

with $\beta_i = \|\vec{b}_i - \vec{t}\|$, i=1, ..., N, where $\vec{b}_i$ is the unit vector representing the boresight direction of the i-th beam and $\vec{t}$ was defined above. Furthermore, $n_i(t)$, i=1, ..., N Equation Set 5

By Operating the Antenna to Acquire Sample Data 190 in a Relatively Short Time span, such as less than 5 seconds, the time-dependent character for a given set of measurements may be disregarded. In such a case, the index t relating to time as specified in Equation Set 5 may be omitted.

A non-linear N-dimensional function may then be described:

$$F(P_0, \beta_1, \beta_2, \ldots, \beta_N) = \begin{bmatrix} P_0 G_R(\beta_1) - \tilde{P}_{R,1} \\ P_0 G_R(\beta_2) - \tilde{P}_{R,2} \\ \vdots \\ P_0 G_R(\beta_N) - \tilde{P}_{R,N} \end{bmatrix}$$

Equation 6

Because $\vec{b}_i$, i=1, ..., N are known by the UT 108 and $\vec{t}$ (the actual direction 406 towards the target, such as the satellite 102) can be fully described by the spherical coordinates pair $(\theta_t, \emptyset_t)$ (as shown in the coordinate transformation of Equation 1), the function F can be re-parameterized as:

$$F(P_0, \theta_t, \emptyset_t) = \begin{bmatrix} P_0 G_R(\|\vec{b_1} - \overrightarrow{(\theta_t, \emptyset_t)}\|) - \tilde{P}_{R,1} \\ P_0 G_R(\|\vec{b_2} - \overrightarrow{(\theta_t, \emptyset_t)}\|) - \tilde{P}_{R,2} \\ \vdots \\ P_0 G_R(\|\vec{b_N} - \overrightarrow{(\theta_t, \emptyset_t)}\|) - \tilde{P}_{R,N} \end{bmatrix}$$

Equation 7

Given Equation 7, an algorithm for a least-square estimator for the pair $(\theta_t, \emptyset_t)$ is defined as follows:

$$\left(\hat{P}_0, \hat{\theta}_t, \hat{\emptyset}_t\right) = \arg \min_{P_0, \theta_t, \emptyset_t} \|F(P_0, \theta_t, \emptyset_t)\|^2$$

Equation 8

Equation 8 may also be used to determine an estimate for $P_0$, using gradient-based methods.

At 816 the UT 108 may operate the antenna of the UT 108 to direct the receive beam in the estimated direction 502. With the UT 108 now directing the receive beam in the estimated direction 502 and remaining in that direction, the UT 108 may receive an entire beacon transmission from a satellite 102 of the constellation, including the second portion of the beacon transmission. For example, the beacon transmission may be received using a satellite network interface of the communication system 178 of the UT 108. In some implementations, this may be the beacon transmission specific to the satellite 102 sought. In other implementations, a beacon transmission from another satellite 102 in the constellation may be used.

At 818 the UT 108 receives the second ephemeris data 156 from the satellite 102.

At 820, based on the second ephemeris data 156, precision tracking data 196 is determined.

At 822 the satellite 102 is tracked by the antenna of the UT 108. For example, the precision tracking data 196 may be used to steer the antenna. In another example, other techniques may be used to track the satellite 102.

At 824 the UT 108 establishes communication with the satellite 102. For example, the UT 108 may send a signal to the satellite 102 requesting grant data to use an uplink to the satellite 102. The UT 108 and the satellite 102 may perform other handshaking operations to establish bi-directional communication with the satellite 102. This allows the UT 108 entry to the network, allowing upstream data 112 and downstream data 142 to be transferred by the UT 108 via the satellite 102. As part of this bi-directional communication, at 834 the satellite 102 establishes communication with the UT 108.

In some implementations, one or more of the operations described may be combined, re-ordered, or omitted. For example, in some implementations operations 818-820 may be omitted.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A user terminal (UT) comprising:
a receiver connected to an electronically steerable phased array antenna ("antenna"); and
a first set of one or more processors executing instructions to:
determine, at a first time, first data comprising a current time and a geolocation of the UT;
determine first ephemeris data that is acquired prior to the first time and is outdated, wherein the first ephemeris data is associated with one or more satellites of a constellation of non-geostationary satellites;
determine, based on the first data and the first ephemeris data, a first predicted direction of a first satellite of the constellation relative to the UT;
determine parameter data indicative of receive antenna gain of the antenna;
responsive to determining the first predicted direction of the first satellite and the parameter data, determine a first set of sample directions relative to the first predicted direction; and
responsive to determining the first set of sample directions:
operate the antenna to direct a respective receive beam toward each of the first set of sample directions;
operate the receiver to determine second data indicative of a received signal strength of a signal received from each of the first set of sample directions; and
determine, using the parameter data and the second data, a second estimated direction of the first satellite relative to the UT using a least-square estimation algorithm.

2. The UT of claim 1, wherein to determine the second estimated direction, the first set of one or more processors further execute instructions, to:
determine, based on the parameter data and the received signal strength for each of the first set of sample directions, a plurality of actual powers received, wherein each actual power received of the plurality of actual powers received is indicative of an actual power received of the signal from each of the first set of sample directions;
determine, based on the parameter data, a plurality of predicted powers received, wherein each predicted power received of the plurality of predicted powers received is indicative of a predicted power received for the signal received from each of the first set of sample directions; and
determine the second estimated direction such that a value of a square of an absolute value of a sum of differences between individual ones of the plurality of actual powers received and corresponding ones of the plurality of predicted powers received for the first set of sample directions is minimal.

3. The UT of claim 1, wherein the first set of sample directions comprises at least three directions.

4. The UT of claim 1, wherein the first set of sample directions are centered on the first predicted direction and each of the first set of sample directions is evenly spaced with respect to other directions in the first set of sample directions.

5. The UT of claim 1, wherein for each direction of the first set of sample directions:
a first difference between an azimuth value of the first predicted direction and an azimuth value of the each direction of the first set of sample directions is less than a first threshold; and
a second difference between an elevation value of the first predicted direction and an elevation value of the each direction of the first set of sample directions is less than a second threshold.

6. The UT of claim 1, the first set of one or more processors further executing the instructions to:
retrieve, based on the first predicted direction, the first set of sample directions.

7. A method comprising:
determining first ephemeris data that is outdated;
determining, using the first ephemeris data, a first predicted direction of a first satellite with respect to a user terminal, wherein the first satellite is part of a constellation of non-geostationary satellites;
responsive to the determining the first predicted direction of the first satellite, determining a first set of sample directions relative to the first predicted direction;
responsive to the determining the first set of sample directions, directing a respective receive beam toward each direction of the first set of sample directions;
responsive to the directing the respective receive beam toward the each direction of the first set of sample directions, determining sample data indicative of a received signal strength of one or more signals received from the each direction of the first set of sample directions;
determining a second direction based on parameter data and the sample data; and
directing a receive beam toward the second direction.

8. The method of claim 7, further comprising:
    determining an actual power received for each of the sample directions based on the parameter data and the received signal strength for each of the sample directions;
    determining, for each of the sample directions, a predicted power based on the parameter data and a difference between the sample direction and a candidate direction; and
    determining the second direction as the candidate direction that results in a minimum value of a square of an absolute value of a difference between the actual power received and the predicted power for the first set of directions.

9. The method of claim 7, wherein the first set of sample directions comprises at least three sample directions.

10. The method of claim 7, wherein the first set of sample directions are centered on the first predicted direction and are evenly spaced with respect to one another.

11. The method of claim 7, wherein for each direction of the first set of sample directions:
    a first difference between an azimuth value of the first predicted direction and an azimuth value of the each direction of the first set of sample directions is less than a first threshold; and
    a second difference between an elevation value of the first predicted direction and an elevation value of the each direction of the first set of sample directions is less than a second threshold.

12. The method of claim 7 further comprising:
    retrieving, based on the first predicted direction, the first set of sample directions.

13. A system comprising:
    a receiver connected to an electronically steerable antenna ("antenna"); and
    a first set of one or more processors executing instructions to:
        determine first ephemeris data that is outdated;
        determine, based on the first ephemeris data, a first direction toward a first satellite of a constellation of non-geostationary satellites;
        responsive to determining the first direction, determine a first set of sample directions;
        responsive to determining the first set of sample directions, operate the antenna to direct a respective receive beam toward each of the first set of sample directions;
        responsive to operating the antenna to direct the respective receive beam toward each of the first set of sample directions, operate the receiver to determine sample data indicative of a received signal strength of one or more signals received for each direction of the first set of sample directions;
        determine parameter data indicative of receive antenna gain of the antenna;
        determine a second direction using the parameter data and the sample data; and
        operate the antenna to direct the receive beam toward the second direction.

14. The system of claim 13, the first set of one or more processors further executing instructions to:
    determine, based on the parameter data and the received signal strength for each of the first set of sample directions, a plurality of actual powers received, wherein each actual power received of the plurality of actual powers received is indicative of an actual power received of the one or more signals from the each of the first set of sample directions;
    determine, based on the parameter data, a plurality of predicted powers received, wherein each predicted power received of the plurality of predicted powers received is indicative of a predicted power received for the one or more signals received from the each of the first set of sample directions; and
    determine the second direction such that a value of a square of an absolute value of a sum of differences between individual ones of the plurality of actual powers received and corresponding ones of the plurality of predicted powers received for the first set of sample directions is minimal.

15. The system of claim 13, wherein the first set of sample directions comprises at least three sample directions.

16. The system of claim 13, wherein the first set of sample directions are centered on the first direction and are evenly spaced with respect to one another.

17. The system of claim 13, wherein each direction of the first set of sample directions is separated from other directions in the first set of sample directions by at least a minimum angular separation.

18. The system of claim 13, wherein for each direction of the first set of sample directions:
    a first difference between an azimuth value of the first direction and an azimuth value of the each direction of the first set of sample directions is less than a first threshold; and
    a second difference between an elevation value of the first direction and an elevation value of the each direction of the first set of sample directions is less than a second threshold.

19. The system of claim 13, the first set of one or more processors further executing the instructions to:
    retrieve, based on the first direction, the first set of sample directions.

20. The system of claim 13, the first set of one or more processors further executing the instructions to:
    determine first data comprising a current time, geolocation of the antenna, and orientation of the antenna with respect to a specified direction, wherein the first direction is further determined based on the first data;
    receive, while the antenna directs the receive beam toward the second direction, second ephemeris data from the first satellite;
    determine, based on the first data and the second ephemeris data, a third direction; and
    operate the antenna to direct the receive beam toward the third direction.

* * * * *